(12) United States Patent
Suga et al.

(10) Patent No.: US 7,400,363 B2
(45) Date of Patent: Jul. 15, 2008

(54) IMAGE PROCESSING APPARATUS AND IMAGE PROCESSING METHOD

(75) Inventors: Kazumi Suga, Yokohama (JP); Kenji Inoue, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 11/049,676

(22) Filed: Feb. 4, 2005

(65) Prior Publication Data

US 2005/0179821 A1  Aug. 18, 2005

(30) Foreign Application Priority Data

Feb. 16, 2004  (JP)  ............................. 2004-038458

(51) Int. Cl.
*H04N 5/57* (2006.01)
(52) U.S. Cl. .................................... 348/687
(58) Field of Classification Search ................ 348/687, 348/673, 674, 675, 688, 671, 254, 223.1, 348/655, 603
See application file for complete search history.

(56) References Cited

U.S. PATENT DOCUMENTS

| | | | | | |
|---|---|---|---|---|---|
| 4,489,349 | A | * | 12/1984 | Okada | 348/674 |
| 5,546,134 | A | * | 8/1996 | Lee | 348/673 |
| 5,668,569 | A | * | 9/1997 | Greene et al. | 345/103 |
| 5,926,174 | A | | 7/1999 | Shibamiya et al. | 345/213 |
| 6,348,931 | B1 | | 2/2002 | Suga et al. | 345/699 |
| 6,388,716 | B1 | * | 5/2002 | Tsuzuki et al. | 348/687 |
| 6,714,212 | B1 | | 3/2004 | Tsuboyama et al. | 345/696 |
| 6,831,634 | B1 | * | 12/2004 | Shigeta | 345/213 |
| 6,967,687 | B1 | | 11/2005 | Suga | 348/441 |
| 7,227,519 | B1 | * | 6/2007 | Kawase et al. | 345/77 |
| 7,227,520 | B2 | * | 6/2007 | Watanabe et al. | 345/77 |
| 2003/0133019 | A1 | * | 7/2003 | Higurashi et al. | 348/218.1 |

FOREIGN PATENT DOCUMENTS

| | | |
|---|---|---|
| JP | 4-286275 | 10/1992 |
| JP | 5-150729 | 6/1993 |

* cited by examiner

*Primary Examiner*—Paulos M Natnael
(74) *Attorney, Agent, or Firm*—Fitzpatrick, Cella, Harper & Scinto

(57) ABSTRACT

An image processing apparatus for performing image processes corresponding to input signals of multiple types, includes a luminance correcting unit that performs correction process on an input signal so as to correct for display luminance, a luminance decreasing unit that multiplies the input signal with a gain smaller than "1", and a gamma correcting unit that performs gamma correction with a gamma value smaller than "1" on the input signal. The luminance decreasing unit and the gamma correcting unit are combined together to execute a first correction process that decreases a luminance of a highlight portion of an image while maintaining or increasing the luminance of a halftoned portion of the image, and the luminance decreasing unit executes a second correction process that decreases the luminance for substantially overall tone levels of the image.

4 Claims, 11 Drawing Sheets

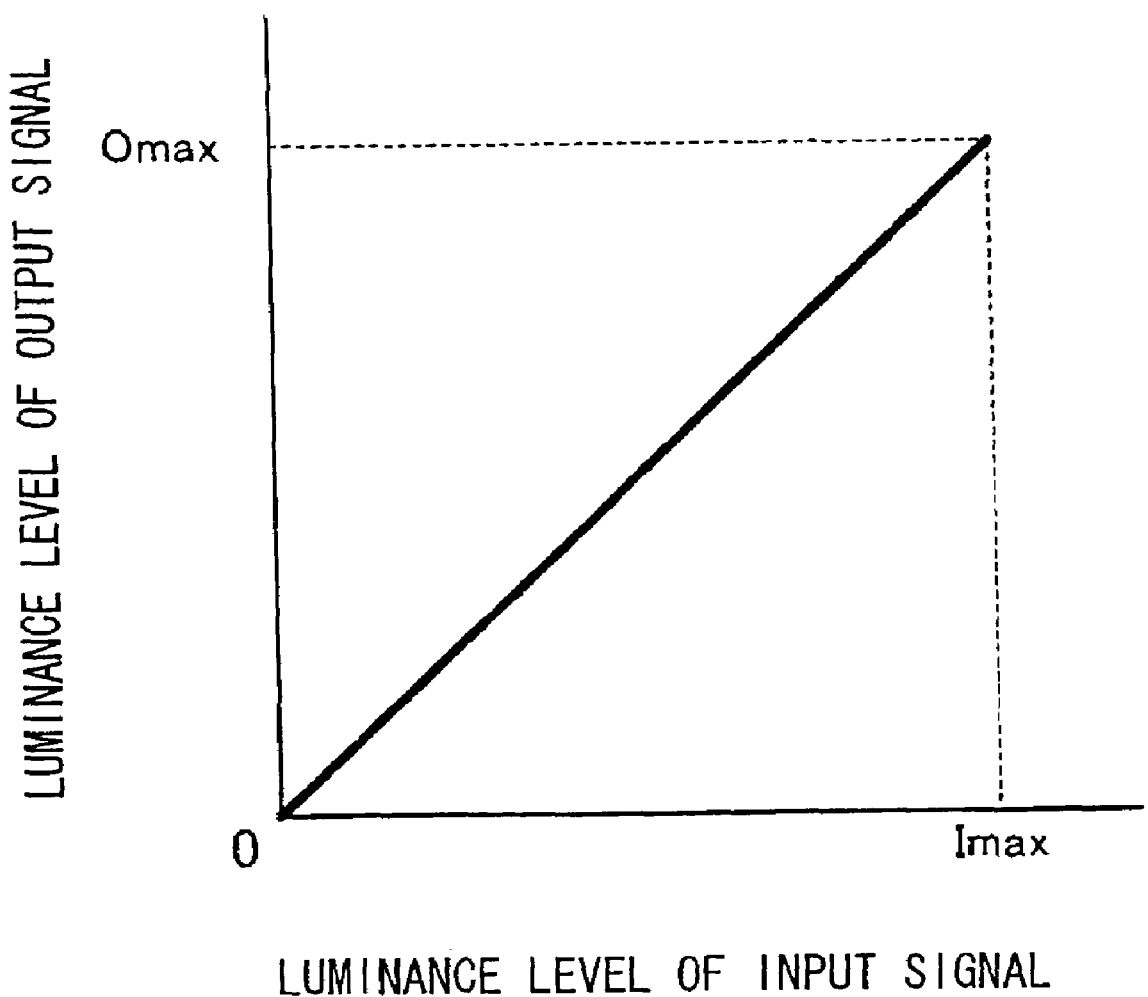

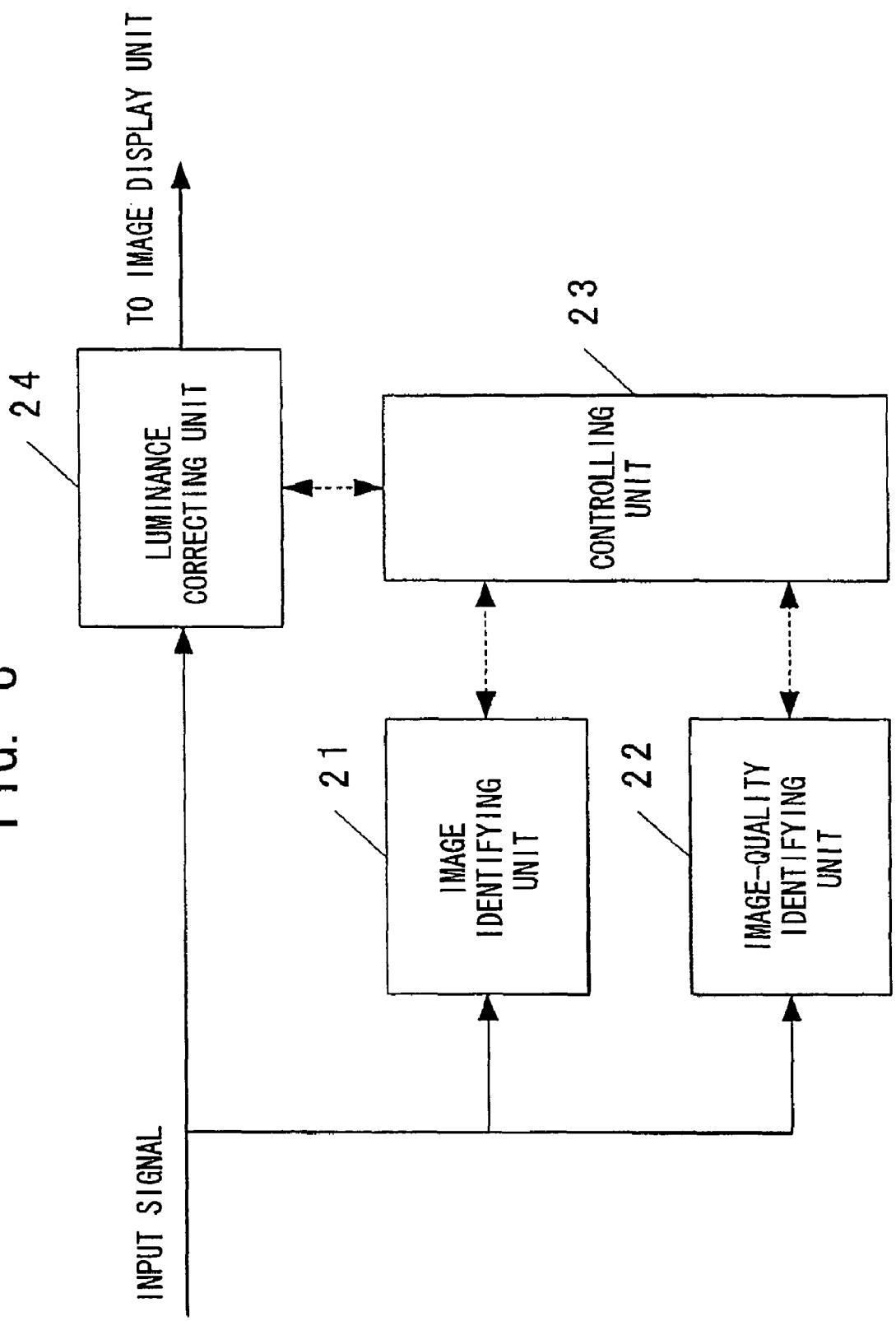

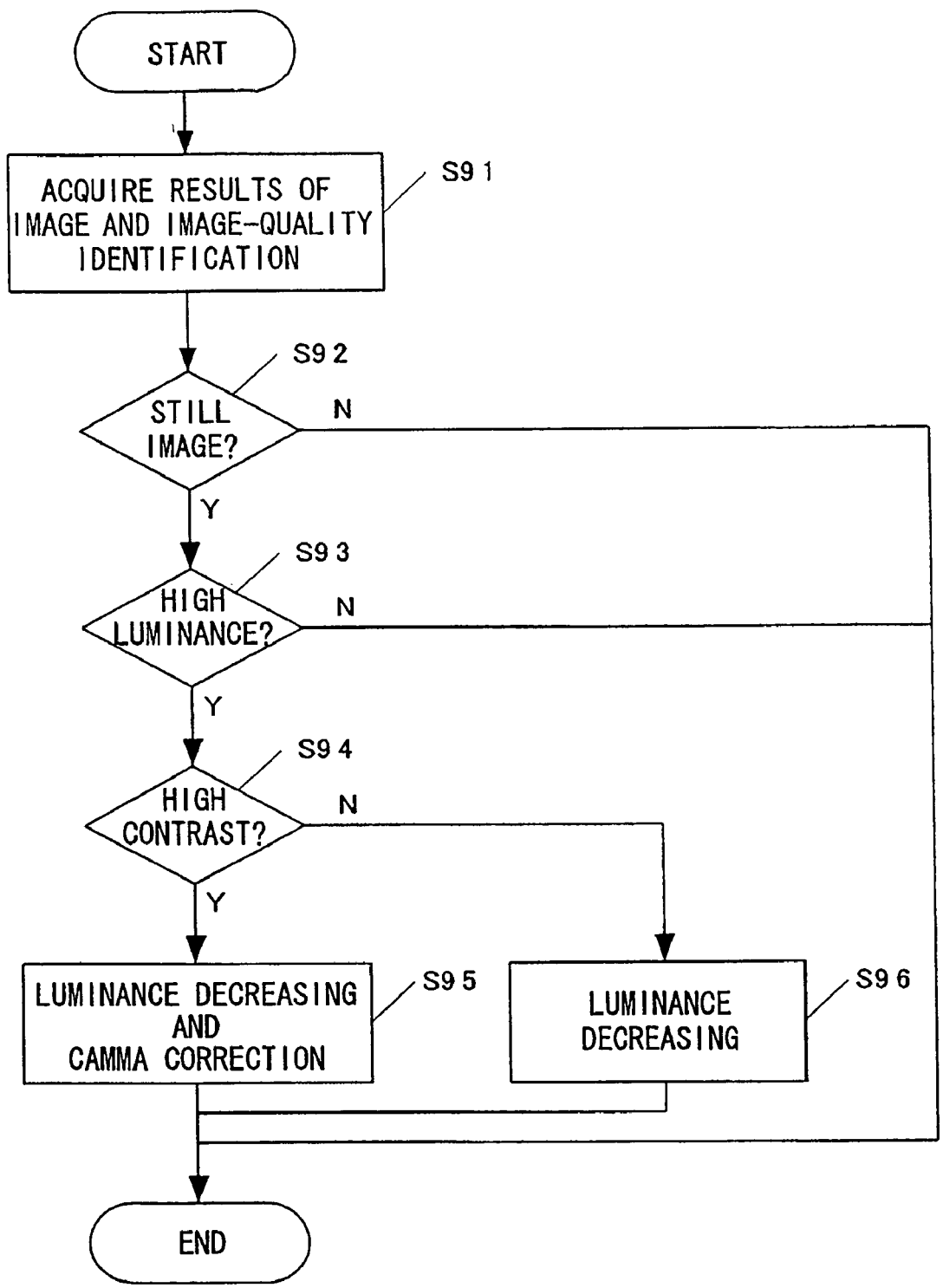

IMAGE PROCESSING APPARATUS AND IMAGE PROCESSING METHOD

BACKGROUND OF THE INVENTION

1. Field of the Invention

The present invention relates to techniques of abating so-called "burn-in" in an image display apparatus supporting input signals of multiple types.

2. Description of Related Art

In a flat-panel image display apparatus (flat-panel display) of, for example, a liquid crystal or plasma type, when a same still image is displayed for a long time, so-called "burn-in" occurs. The "burn-in" refers to a phenomenon in which deterioration (reduction in emission luminance) of a part of a screen advances thereby allowing image trails (image lags) to be visible, and the phenomenon tends to appear at, for example, an edge portion of a still image.

Japanese Unexamined Patent Laid-Open No. 4-286275 and No. 5-150729 propose methods of abating the "burn-in" by reducing the luminance level upon detecting a predetermined time of display of still images.

In recent years, image display apparatuses are introduced that support ordinary TV signals and other input signals of various types, such as PC input signals input from PCs (personal computers) and DSC input signals input from DSCs (digital still cameras).

In the case of adaptation of the conventional techniques to an image display apparatus of the above-described type, depending on the type of an input signal (namely, an input mode (port) or image characteristics), a case can potentially occur in which appropriate display is not performed. Particularly, with the luminance level uniformly decreased as in the conventional case, when displaying PC input signals or still images of high luminance and high contrast, problems occur in that the screen is darkened overall, thereby causing deterioration in visibility and operability.

SUMMARY OF THE INVENTION

In view of the above circumstances, the present invention is to provide a technique that, in an image display apparatus supporting input signals of multiple types, is capable of abating "burn-in" while maintaining high display quality, irrespective of the type of the input signal.

A first aspect of the present invention is an image processing apparatus for performing image processes corresponding to input signals of multiple types, wherein: the image processing apparatus comprises a luminance correcting unit that performs correction process on input signals so as to correct for display luminance; and the luminance correcting unit changes the correction process corresponding to the type of the input signal.

A second aspect of the present invention is an image processing method for performing image processes corresponding to input signals of multiple types, the method comprising: a receiving step for receiving an input signal; and a luminance correcting step for performing a correction process on the input signal so as to correct for display luminance, wherein: in the luminance correcting step, the correction process is changed corresponding to the type of the input signal.

BRIEF DESCRIPTION OF THE DRAWINGS

FIGS. 4A to 4C are views showing I/O characteristics of the entirety of a luminance correcting unit;

FIG. 8 is a block diagram showing a configuration relative to luminance correction in an image display apparatus according to a third embodiment; and FIG. 9 is a flow diagram representing a luminance correction process according to the third embodiment.

DESCRIPTION OF THE PREFERRED EMBODIMENTS

Figure 1:
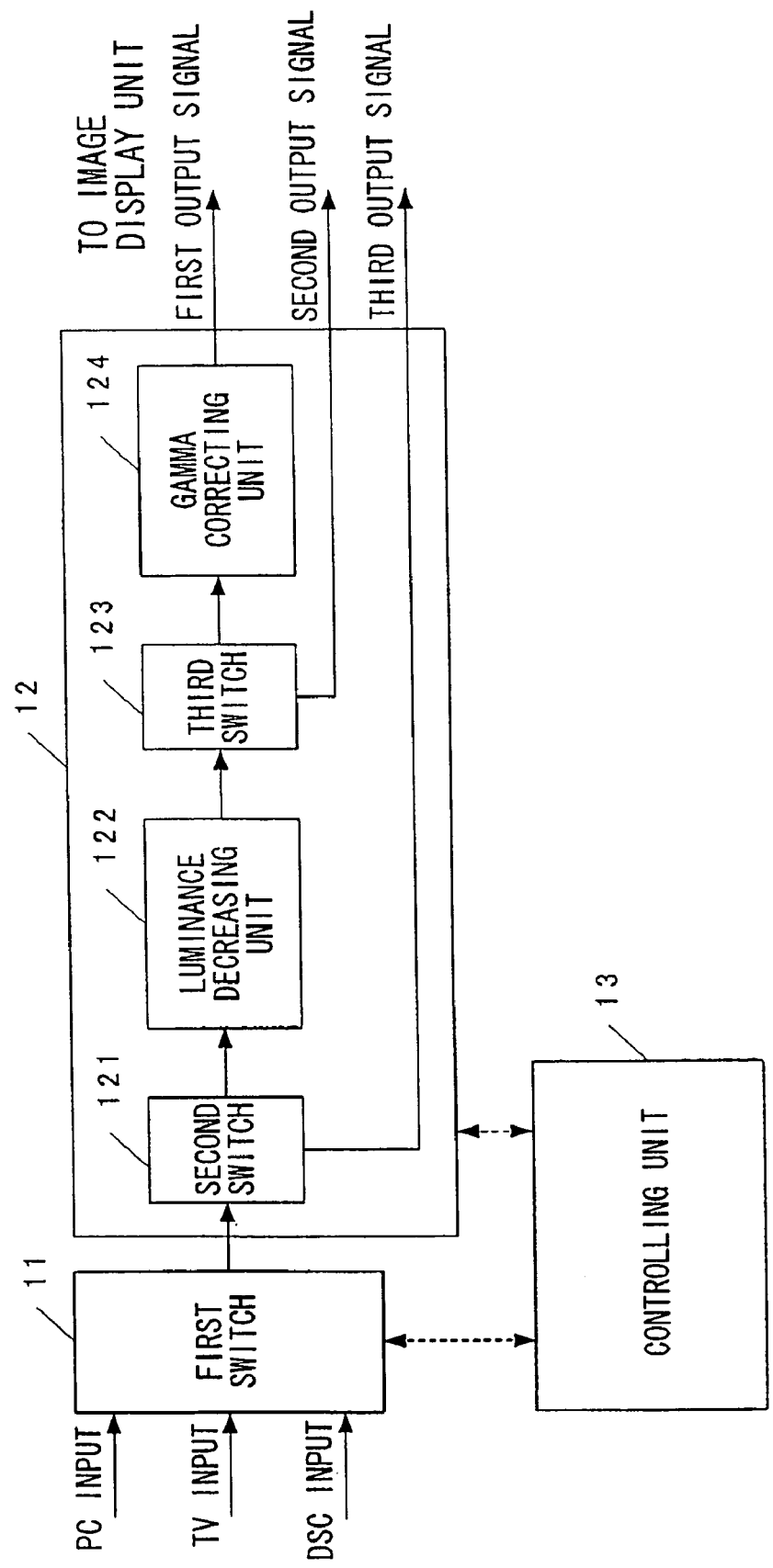
FIG. 1 is a block diagram of a configuration relative to luminance correction in an image display apparatus according to a first embodiment of the present invention.

An image display apparatus according to a typical embodiment of the present invention is a flat panel display, such as an LCD (liquid crystal display), PDP (plasma display panel), FED (field emission display), and SED (surface-conduction electron-emitter display). The image display apparatus supports input signals of multiple types.

Types of input signals include types of input modes (ports) and the types of image characteristics (characteristics of images being input with an input signal). The types of input modes include TV signals in, for example, TV broadcast and video input; PC input signals being input from PCs; and DSC input signals being input from DSCs. The types of image characteristics include the difference between the motion image and still image, difference between the high-contrast image and the low-contrast image, difference between the high-luminance image and low-luminance image. Generally speaking, images being input through TV signals are motion images, and images being input with DSC input signals are still images. Although images being input through PC input signals are still images in most cases, motion images also are input therethrough depending on the case.

The image display apparatus has an image processing apparatus and an image display unit. The image processing apparatus is a portion that performs an appropriate image process for an input signal being input to the image display apparatus thereby to generate and output a signal suitable to a display process in the image display unit. The image processing apparatus of the present embodiment has a luminance correcting unit. The luminance correcting unit performs a correction process for an input signal to correct for the display luminance in order to abate the "burn-in". The luminance correcting unit is implemented by hardware (circuit) or a combination of hardware (circuit) and software (program). The image display unit displays an image in accordance with a post-correction input signal, and is configured to include, for example, a display panel, which is formed of a large number of image display elements, and a drive circuit for driving the display panel.

The luminance correcting unit in the present embodiment has a plurality of correction process functions. The luminance correcting unit changes the correction process to be performed depending on the type of input signal. Accordingly, appropriate luminance correction can be performed recognizing the difference in the input mode or the image characteristics and corresponding thereto. Consequently, regardless of the type of the input signal, while maintaining display quality, the "burn-in" can be abated.

More specifically, the luminance correcting unit has three correction process functions for first to third correction processes. The first correction process decreases the luminance of a highlight portion of an image while maintaining or increasing the luminance of halftoned portions of the image. The second correction process decreases the luminance for substantially the overall tone levels of the image. The third correction process operates without changing the luminance. The third correction process may be of the type that outputs the input signal as it is without performing any process, but is handled as one correction process.

According to the first correction process, since the luminance of the highlight portion wherein the "burn-in" tends to occur is decreased, the "burn-in" can be abated. On the other hand, the luminance of a halftoned portion of the image is maintained or increased, but is not decreased. As such, the first correction process can be contemplated to be of a process that decreases the luminance of only a highlight portion of the entirety of an image. Thereby, the "burn-in" can be abated without impairing the image visibility and operability. This process is, therefore, is suitable to high-contrast still images,. such as an image that can be input through a PC input signal (images to be displayed on a PC operation screen and a web page screen, for example).

According to the second correction process, the luminance (brightness) of the overall image is uniformly decreased (darkened), the "burn-in" can be abated while the image gradation (tone) is maintained. The process accordingly is suitable for still images of continuous tone, such as images to be input through DSC input signals (images captured by a digital camera).

With reference to the drawings, more practical embodiments of the luminance correcting unit will be exemplarily described in detail below.

First Embodiment

FIG. 1 is a block diagram showing a configuration of an image processing apparatus relative to luminance correction in an image display apparatus according to a first embodiment of the present invention. In FIG. 1, solid lines represent signal lines, and broken lines represent control lines.

The image processing apparatus has a first switch 11, a luminance correcting unit 12, and a controlling unit 13. The luminance correcting unit 12 has a second switch 121, a luminance decreasing unit 122, a third switch 123, and a gamma correcting unit 124.

(First Switch)

The image display apparatus has a plurality of input modes and is capable of receiving of input signals of multiple types (three types: a PC input signal, TV signal, and DSC input signal, in the present embodiment). The first switch 11 switches among the input signals in accordance with control of the controlling unit 13, and outputs to the luminance correcting unit 12 an input signal as a display target or a correction target.

(Luminance Correcting Unit)

As described above, the luminance correcting unit 12 is configured of the second switch 121, the luminance decreasing unit 122, the third switch 123, and the gamma correcting unit 124. An output signal from the luminance correcting unit 12 is output to an image display unit (not shown).

Under the control of the controlling unit 13, the second switch 121 switches between a mode in which a signal input from the first switch 11 is output to the luminance decreasing unit 122 and a mode in which the signal is directly transferred to the image display unit.

The luminance decreasing unit 122 performs a luminance decreasing process on the signal input from the second switch 121.

Figure 2:
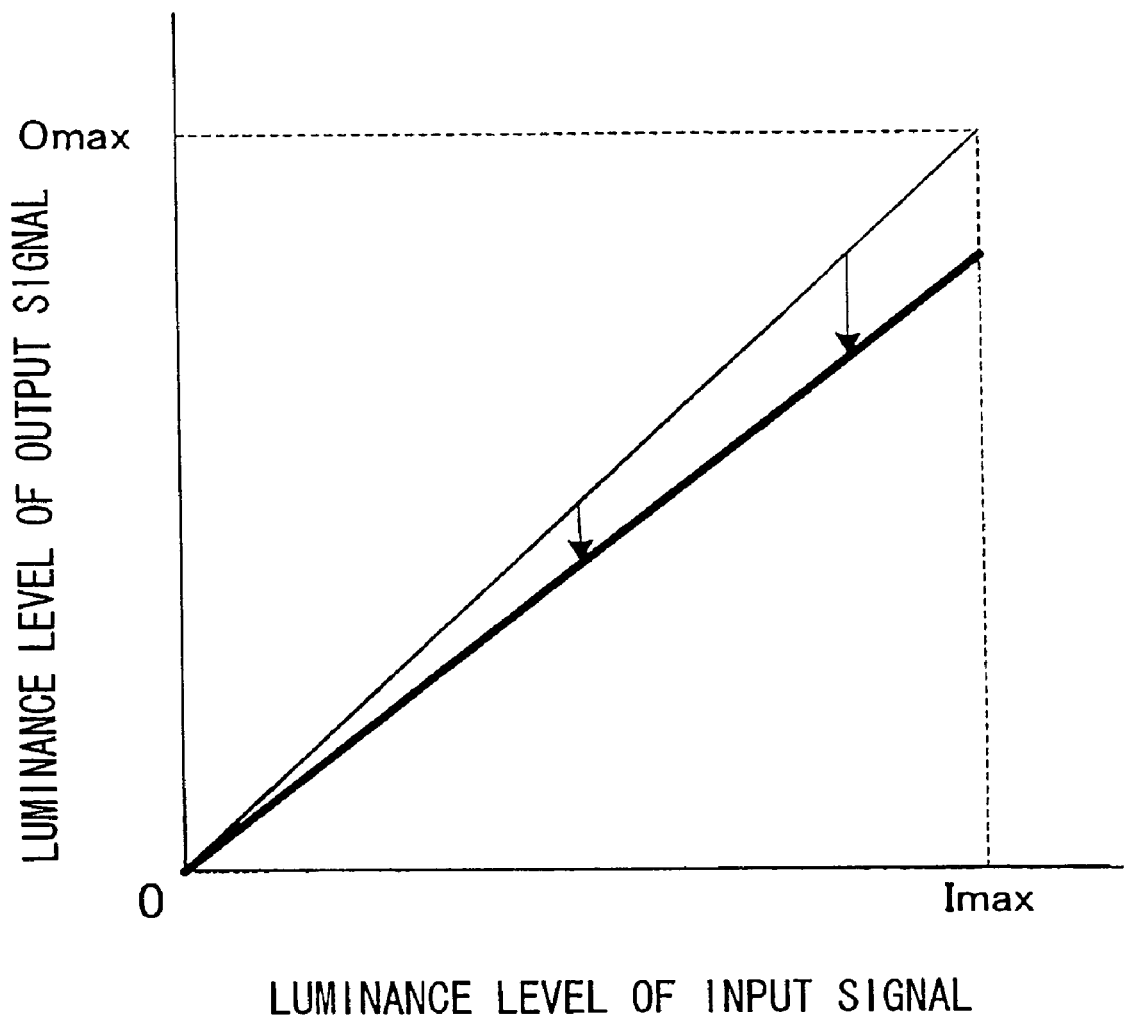
FIG. 2 is a view showing input/output (I/O) characteristics of a luminance decreasing process.

I/O characteristics of the luminance decreasing process are shown in FIG. 2. In FIG. 2, the horizontal axis represents the luminance level (tone level) of the input signal, and the vertical axis represents the luminance level (tone level) of the output signal. The wide line represents I/O characteristics of luminance decreasing process performed in the luminance decreasing unit 122, and the narrow line represents the I/O characteristics in the event where the input signal is directly transferred without being subjected to the luminance decreasing process.

As can be seen from FIG. 2, the luminance decreasing process decreases the luminance to be uniform (linear) for all the image tone levels. Such the process can be implemented in a manner that the input signal is multiplied with a gain less than "1" or a LUT (lookup table) from which the equivalent result can be obtained is adapted.

Under the control of the controlling unit 13, the third switch 123 switches between a mode in which the signal input from the luminance decreasing unit 122 (signal after the luminance decreasing process) is output to the gamma correcting unit 124 and a mode in which the signal is directly transferred to the image display unit.

The gamma correcting unit 124 performs the gamma correction process on the signal input from the third switch 123 and output this signal to the image display unit.

Figure 3:
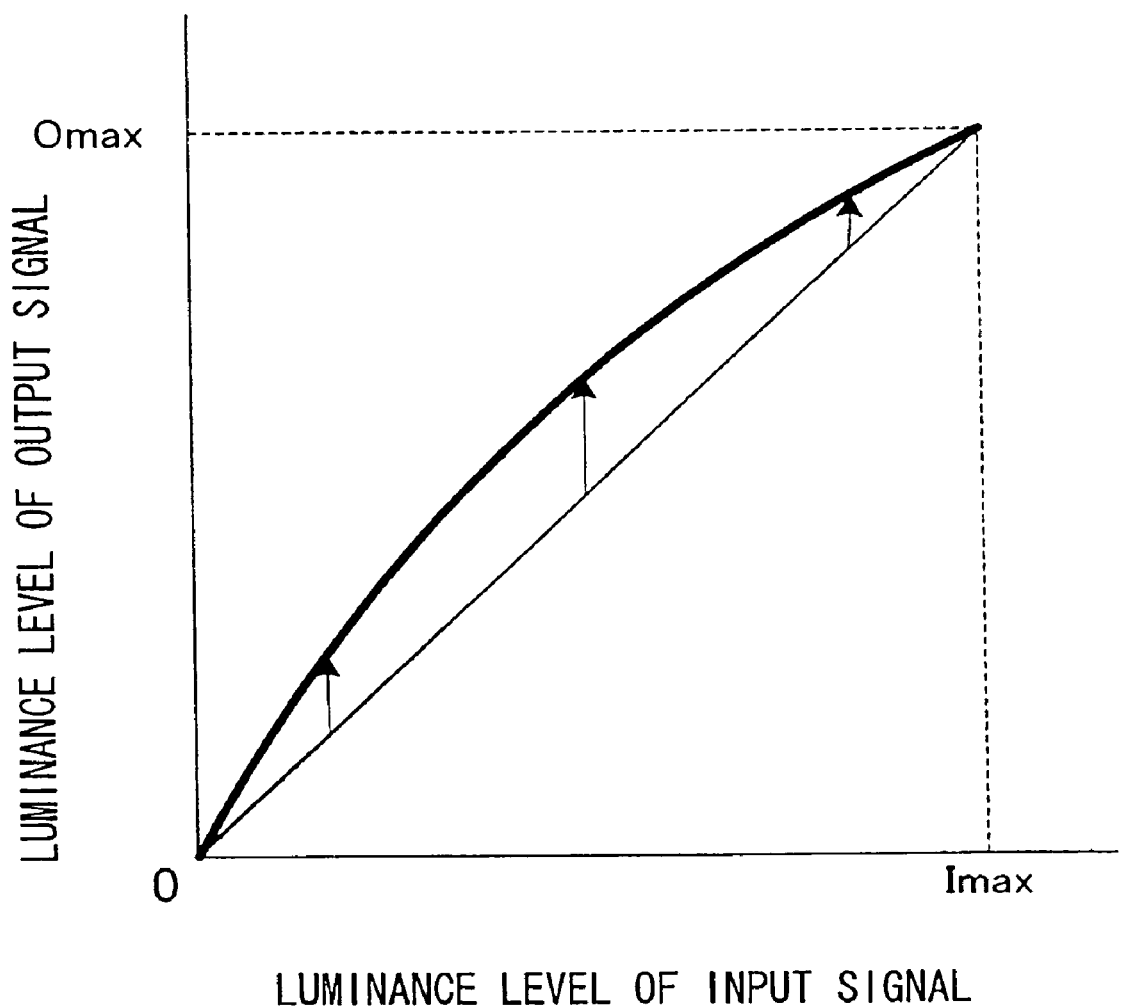
FIG. 3 is a view showing I/O characteristics of a gamma correction process.

I/O characteristics of the gamma correction process are shown in FIG. 3. In FIG. 3, the horizontal axis represents the luminance level (tone level) of the input signal, and the vertical axis represents the luminance level (tone level) of the output signal. The wide line represents I/O characteristics of the gamma correction process performed in the gamma correcting unit 124, and the narrow line represents I/O characteristics in the event where the signal is directly transferred without being subjected to the gamma correction process.

As can be seen from FIG. 3, the gamma correction process increases the luminance of a halftoned portion of an image. Such the process can be implemented in a manner that gamma correction with a gamma value of less than "1" is performed for the input signal or a LUT from which the equivalent result can be obtained is adapted. As the gamma value, 0.45 (that is, a 0.45th-power gamma curve) is preferable.

In the above-described configuration, the signal to be output from the luminance correcting unit 12 is either of the following signals. They are the signal (first output signal shown in FIG. 1) on which the luminance decreasing process and the gamma correction process have been performed, and the signal (second output signal shown in FIG. 1) on which only the luminance decreasing process has been performed, and the signal (third output signal shown in FIG. 1) for which none of the processes has been performed.

Figure 4A:
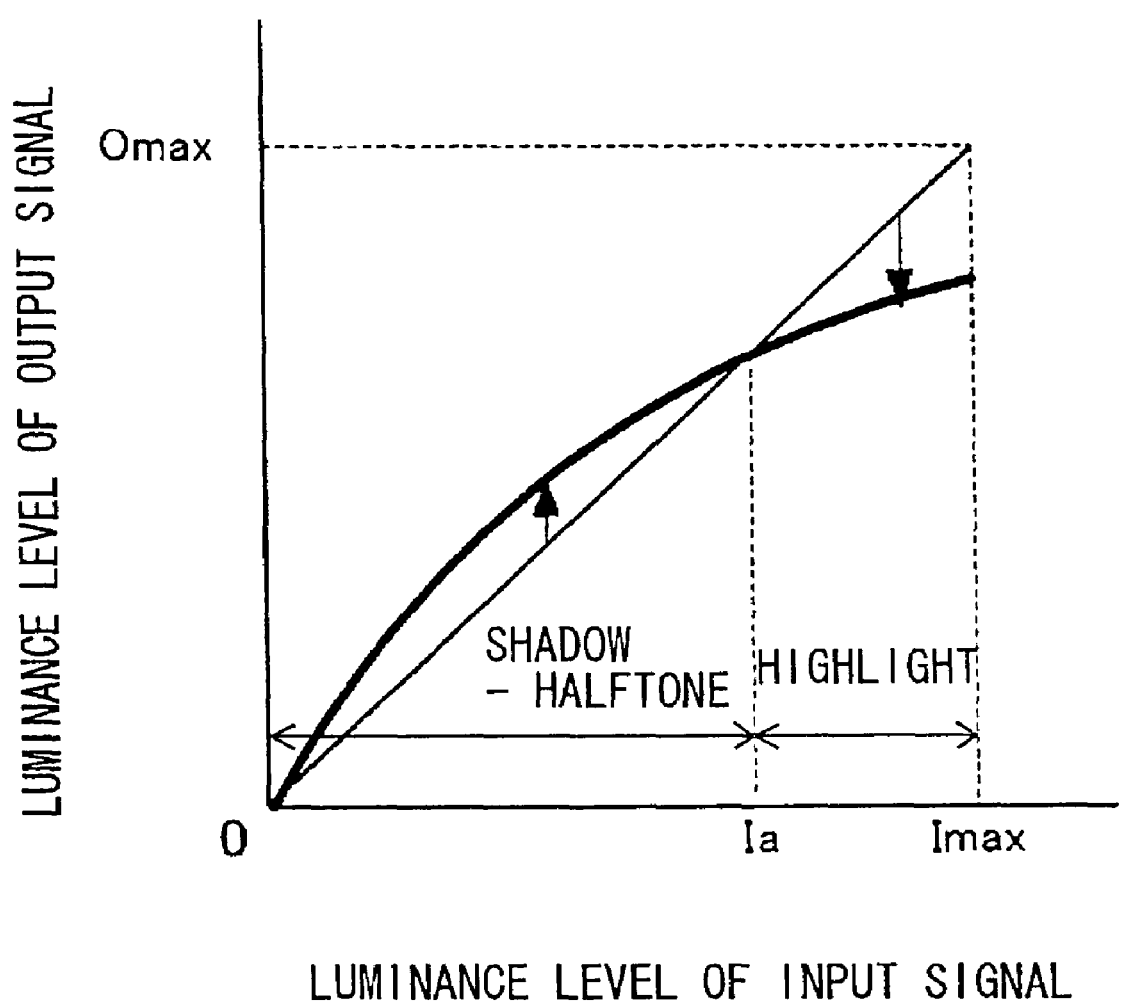
Figure 4B:
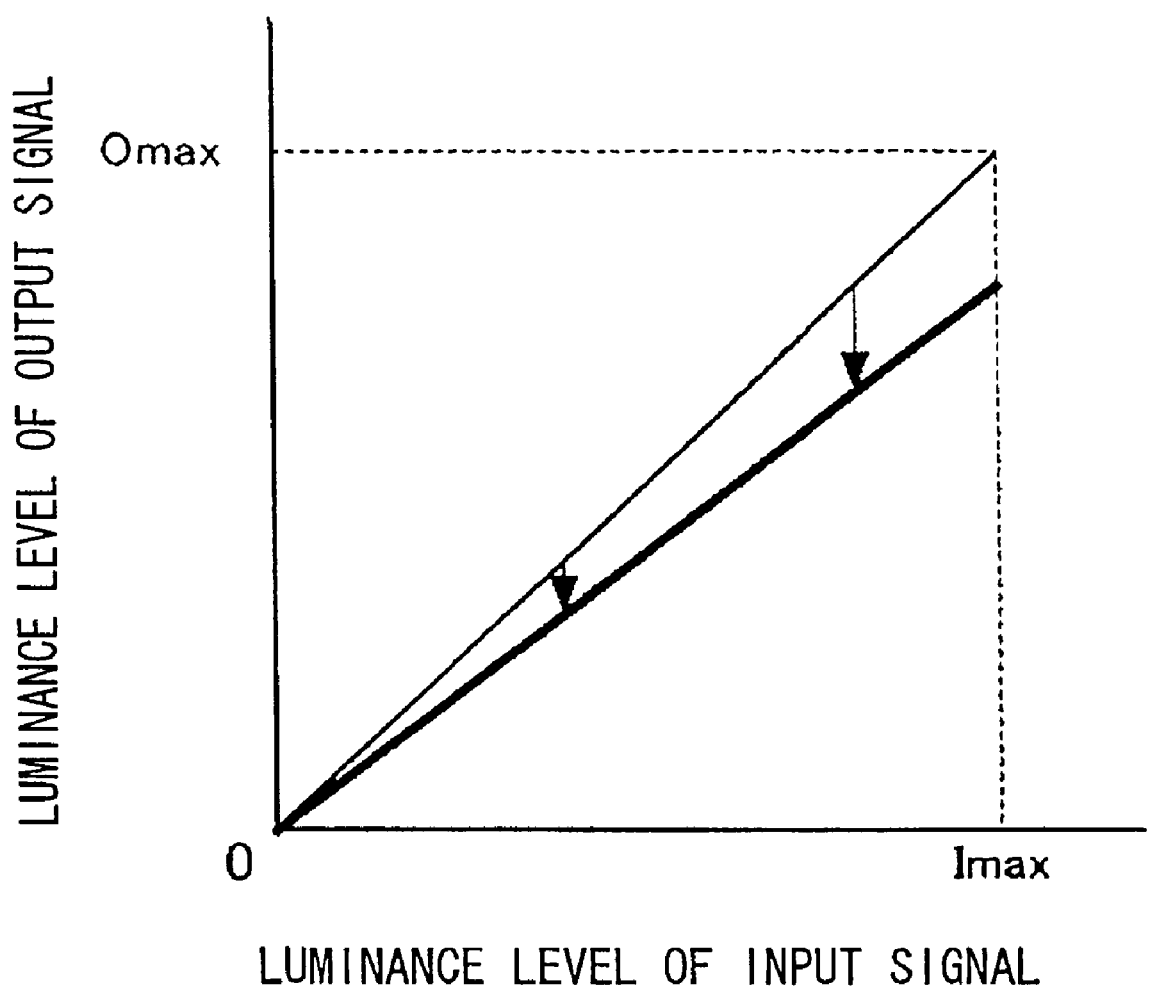

FIGS. 4A to 4C show I/O characteristics of the entirety of the luminance correcting unit 12. FIG. 4A shows the first output signal, FIG. 4B shows the second output signal, and FIG. 4C shows the third output signal. In the views, the horizontal axes, respectively, correspond to the input signals to the luminance correcting unit 12 (output signals from the first switch 11); and the vertical axes, respectively correspond to the first to third output signals from the luminance correcting unit 12. In each of FIGS. 4A to 4C, the narrow line represents I/O characteristics in the event where the correction process is not performed. The narrow line is referred to as a "reference line."

As can be seen from FIG. 4A, the I/O characteristics of the first output signal are represented by an upwardly-convex characteristic curve having a crossing point with the reference line. When the input-signal luminance level at the crossing point is Ia, in a range where the input-signal luminance level is Ia or lower, the luminance level of the first output signal is equal or higher to the input-signal luminance level. On the other hand, in a range where the input-signal luminance level is higher than Ia, the luminance level of the first output signal is lower than the input-signal luminance level. Accordingly, when the crossing point Ia is set at the boundary between a halftoned portion and highlight portion of the image, a first output signal can be obtained that has characteristics in which, in comparison to the input signal, the luminance level of the highlight portion is lower, the luminance level of an area from a shadowed portion to halftoned portion of the image is equal or higher. The position of the crossing point Ia can be arbitrarily set by adjusting the gamma value of the gamma correction process or/and the gain of the luminance decreasing process described above. For an ordinary PC image, a lower limit of the highlight portion, that is, the crossing point Ia is preferably set to a range of from 40% to 90% and more preferably to a range of from 60% to 80% of a maximum input-signal luminance level Imax. Thus, in the present embodiment, the luminance decreasing unit 122 and the gamma correcting unit 124 are combined, thereby to implement the first correction process.

As can be seen from FIG. 4B, in comparison to the input signal, the second output signal has a luminance decreased uniformly for the all the tone levels. Thus, in the present embodiment, the signal is passed through the luminance decreasing unit 122, thereby to implement the second correction process.

In addition, as can be seen from FIG. 4C, the third output signal has no change in luminance, in comparison with the input signal. Namely, the third correction process is implemented by performing neither the luminance decreasing process nor the gamma correction process.

(Controlling Unit)

Processing of the controlling unit 13 will be described with reference to a flow diagram of FIG. 5.

The controlling unit 13 controls the first switch 11 to perform switch processing, whereby one input signal is selected as processing target (display target) from multiple types of input signals (at S71 ("S" stands for "step")). In correspondence to the switch processing, the controlling unit 13 controls the luminance correcting unit 12 so that the correction process suitable to the type of the input signal is performed.

Figure 5:
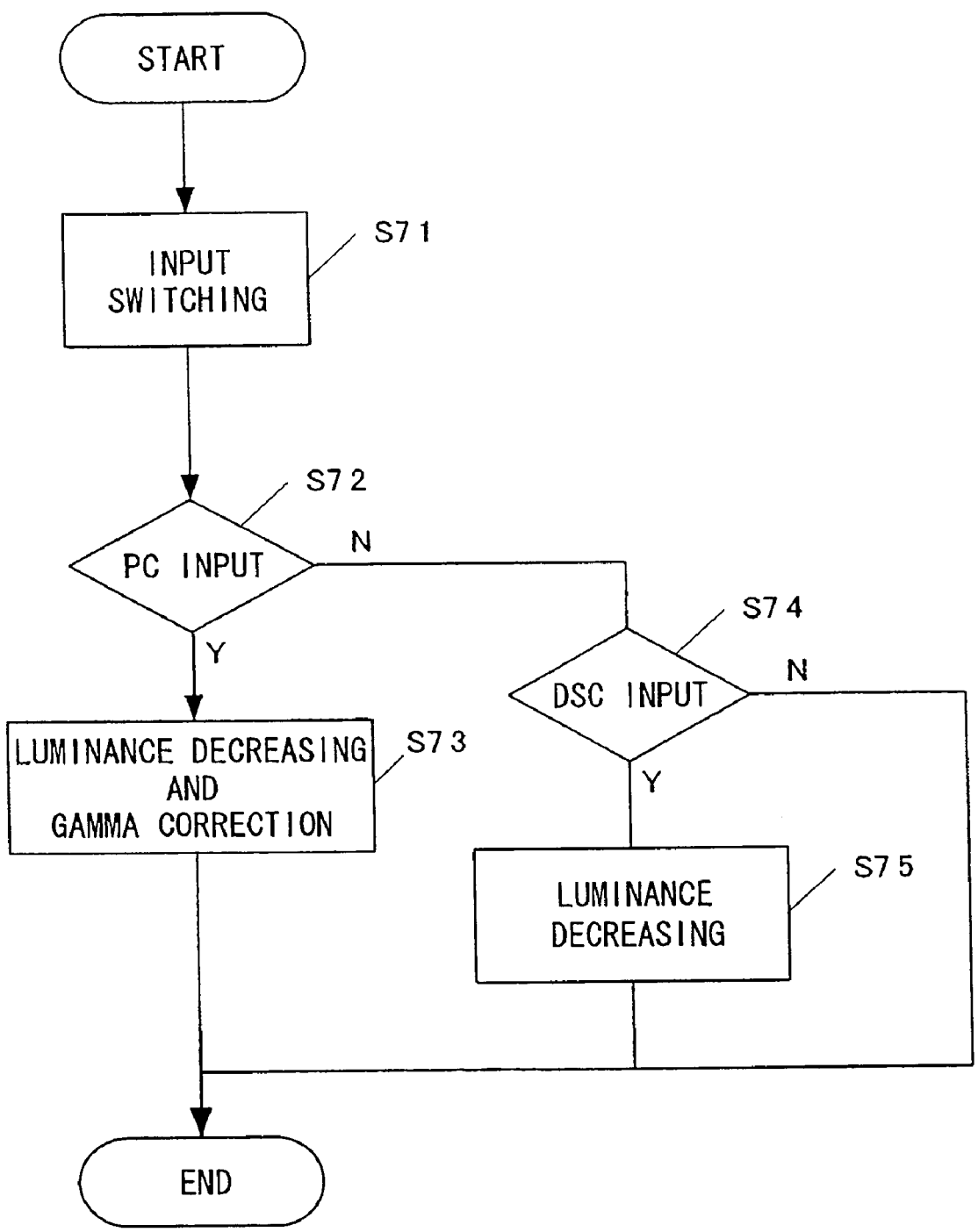
FIG. 5 is a flow diagram representing a luminance correction process according to the first embodiment.

According to an example shown in FIG. 5, when the input signal is switched to the PC input signal, the controlling unit 13 controls the second switch 121 and the third switch 123, thereby to set the mode in which the luminance decreasing process and the gamma correction process are provided on the input signal, and the first output signal is output (at S72 and S73).

When the input signal is switched to the DSC input signal, the controlling unit 13 controls the second switch 121 and the third switch 123, thereby to set the mode in which only the luminance decreasing process is provided on the input signal, and the second output signal is output (at S74 and S75) When the input signal is switched to the TV signal, the controlling unit 13 controls the second switch 121, thereby to set the mode in which the correction process in the luminance correcting unit 12 is skipped, and the third output signal is output.

According to the present embodiment described above, for the PC input signal, the "burn-in" can be effectively abated without impairing image visibility and operability. For the DSC input signal, the "burn-in" can be abated while maintaining the image gradation (tone). For the TV signal (motion image) with which the "burn-in" does not easily occur, the correction process can be skipped.

Consequently, irrelevant to the type of the input signal, the "burn-in" can be abated while maintaining high display quality.

Second Embodiment

A second embodiment of the present invention will be described hereinbelow. In the first embodiment, one input signal is selected from the multiple types of input signals, and the luminance correction process is switched corresponding to the selected type of input signal. However, in the second embodiment, switching of the input signal and the luminance correction process is not performed, but the multiple types of input signals are subjected to the luminance correction processes in parallel, the images are synthesized (combined) together, and are output.

Figure 6:
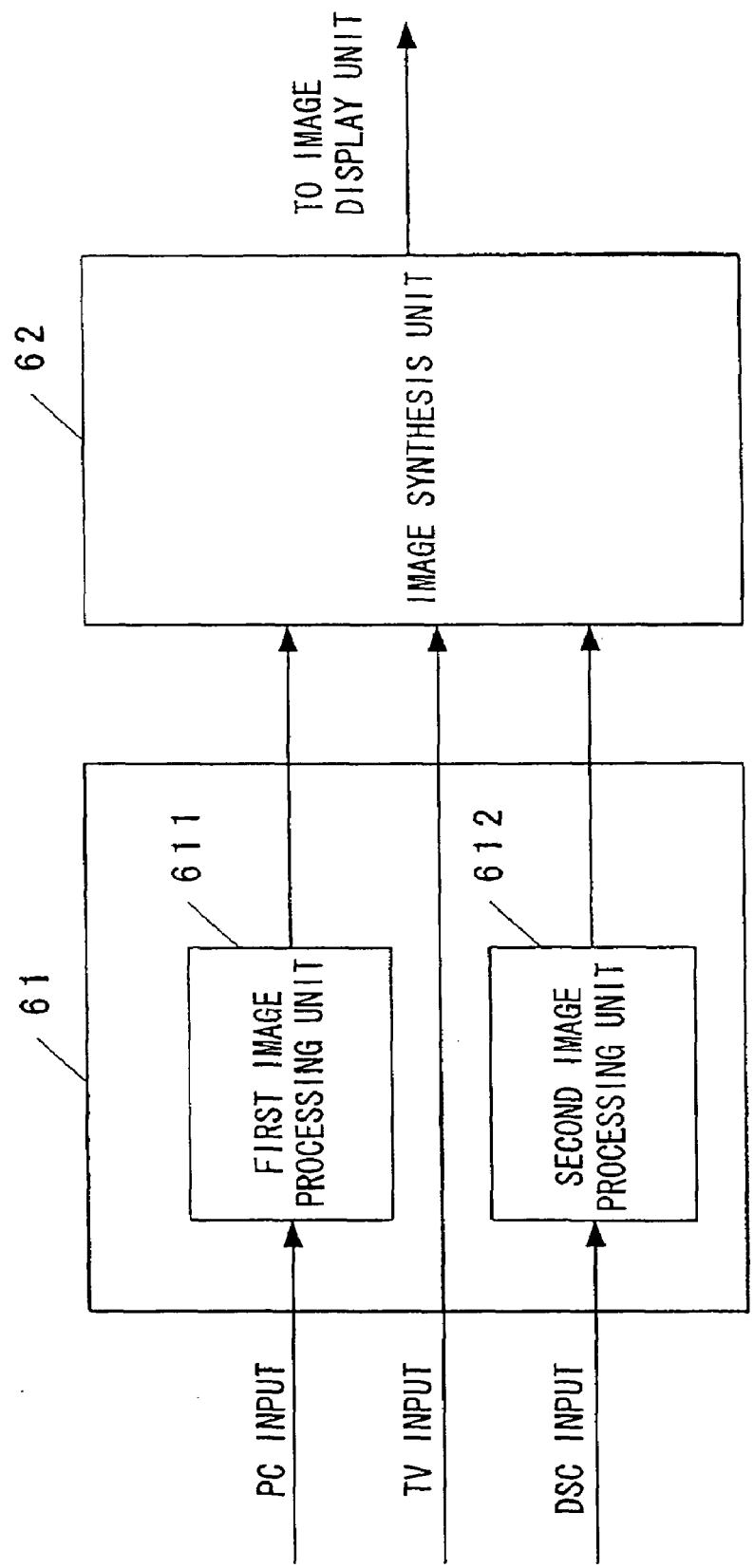
FIG. 6 is a block diagram showing a configuration relative to luminance correction in an image display apparatus according to a second embodiment.

FIG. 6 is a block diagram showing a configuration relative to luminance correction in an image display apparatus according to the second embodiment.

The image display apparatus has a luminance correcting unit 61 and an image synthesis unit 62. The luminance correcting unit 61 is configured of a first image processing unit 611 and a second image processing unit 612. An output of the image synthesis unit 62 is input to an image display unit (not shown).

(Luminance Correcting Unit)

The first image processing unit 611 performs the correction process (corresponding to the first correction process), of which the I/O characteristics are shown in FIG. 4A. The second image processing unit 612 performs the correction process (corresponding to the second correction process), of which the I/O characteristics are shown in FIG. 4B. The process not passing through either of these images processing units corresponds to the third correction process.

In the present embodiment, the luminance correction process to be performed in the luminance correcting unit 61 is predetermined for each type of the input signals. More specifically, in the case of the PC input signal, the signal is input to the first image processing unit 611 so that the luminance of an area from a shadowed portion to halftoned portion of the image is increased, and concurrently, the luminance of a highlight portion of the image is decreased. In the case of the DSC input signal, the signal is input to the second image processing unit 612 so that the luminance is decreased uniformly for all the tone levels. The TV signal is directly transferred without being subjected to the correction process of the luminance correcting unit 61 and is output as it is. Each of the output signals from the luminance correcting unit 61 is input to the image synthesis unit 62.

(Image Synthesis Unit)

Figure 7:
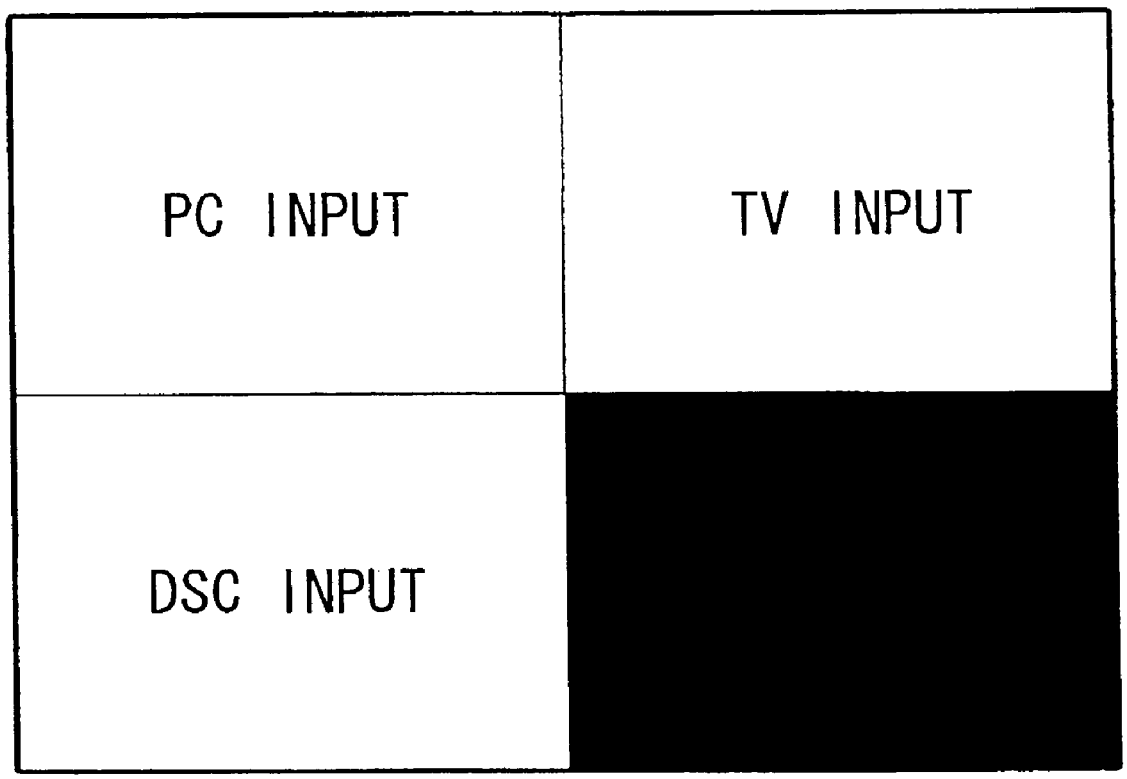
FIG. 7 is a view showing an example of image synthesis.

The image synthesis unit 62 performs image synthesis of the plurality of input signals input from the luminance correcting unit 61, and then outputs the result to an image display unit as shown in FIG. 7, for example. The image synthesis can be implemented in such a manner that the individual input signals are written to corresponding positions of a frame memory, and the entirety of the frame memory is thereafter read in block. However, other image combining methods may be employed.

According to the present embodiment described above, as in the first embodiment, irrelevant to the type of the input signal, the "burn-in" can be abated while maintaining high display quality.

Further, in the present embodiment, the individual correction process functions are provided independently of one another, thereby to enable differential correction processes to be executed in parallel. This makes it possible to distinctively perform appropriate luminance correction processes on individual screens in the event of multi-screen display of input signals of different types.

Third Embodiment

A third embodiment will be described hereinbelow. In each of the first and second embodiments, the individually appropriate luminance correction processes are performed corresponding to the types of the input modes (ports). However, in the third embodiment, individually appropriate luminance correction processes are performed corresponding to the types of image characteristics.

FIG. 8 is a block diagram showing a configuration relative to luminance correction in an image display apparatus according to the third embodiment. In FIG. 8, solid lines represent signal lines, and broken lines represent control lines.

An image display apparatus has an image identifying unit 21, an image-quality identifying unit 22, a controlling unit 23, and a luminance correcting unit 24.

(Image Identifying Unit)

The image identifying unit 21 identifies whether an image input through an input signal is a motion image or a still image. Ordinary identifying methods are of the type that performs a differential comparison of two images in a frame (field) and a previous frame (field), but other methods of a different type may be used. An identification result of the image identifying unit 21 is output to the controlling unit 23.

(Image-Quality Identifying Unit)

The image-quality identifying unit 22 performs identification to determine whether an image input through an input signal is of high luminance or low luminance in comparison to a predetermined luminance reference. In addition, the identifying unit 22 performs identification to determine whether the above-described image is of high contrast or low contrast in comparison to a predetermined contrast reference. The image-quality identifying unit 22 consequently outputs three identification results to the controlling unit 23. The three results are "high luminance and high contrast", "high luminance and low contrast", and "other (=low luminance)".

Luminance identification, that is, identification between the high luminance and the low luminance, may preferably be performed by determination of whether, for example, an average of luminance values (pixel values) of the entirety of an image is greater or smaller than a predetermined threshold value (half of the maximum luminance, for example).

Contrast identification, that is, identification between the high contrast and the low contrast, may preferably be performed by determination of whether, for example, a frequency (number of times) of differential values of inter-adjoining-pixel luminance values (pixel values) greater than a predetermined threshold value (half of a maximum luminance differential) is greater than a predetermined frequency or not. Alternatively, the identification may preferably be performed by determination of whether the average of differential values of adjoining-pixel luminance values (pixel values) is greater than a predetermined threshold value or not.

In each of the luminance and contrast identification processes, the identification may be performed by using either an image in one frame (field) or images in a plurality of frames (fields). The method described above is only an exemplary method, so that a different method may be employed.

(Luminance Correcting Unit)

Under the control of the controlling unit 23, the luminance correcting unit 24 performs the luminance correction process on an input signal, corresponding to the image characteristics thereof, and outputs the result to an image display unit (not shown).

As in the first and second embodiments, the luminance correcting unit 24 performs three types of correction processes: a first correction process that decreases the luminance of a highlight portion of an image while maintaining or increasing the luminance of a halftoned portion of the image; a second correction process that decreases the luminance for substantially the overall tone levels of the image; and the third correction process that operates without changing the luminance. I/O characteristics of the individual processes are, for example, those shown in FIGS. 4A to 4C.

As in the first embodiment, the luminance correcting unit 24 may be configured such that a luminance decreasing unit and a gamma correcting unit are independently provided, and switching is performed between the input signal paths. Alternatively, as in the second embodiment, there may be provided a first image processing unit for performing the luminance decreasing process and the gamma correction process, and a second image processing unit for performing only the luminance decreasing process.

(Controlling Unit)

In accordance with the identification results of the image identifying unit 21 and the image-quality identifying unit 22, the controlling unit 23 controls the luminance correcting unit 24 and thereby switches among the correction processes being performed on input signals. The processing of the controlling unit 23 will be described below with reference to a flow diagram of FIG. 9.

The controlling unit 23 acquires individual identification results of the image identifying unit 21 and the image-quality identifying unit 22 (at S91).

Suppose the event that the identification result of the image identifying unit 21 is indicative of a "still image" (at S92), and concurrently the identification result of the image-quality identifying unit 22 is indicative of "high luminance and high contrast" (at S93 and S94). In this event, the controlling unit 23 controls the luminance correcting unit 24 to execute the first correction process (the luminance decreasing process and the gamma correction process) (at S95).

Alternatively, in the event of a "still image" and "high luminance and low contrast", the controlling unit 23 controls the luminance correcting unit 24 to execute the second correction process (only the luminance decreasing process) (at S96).

Further alternatively, in the event of "other", i.e., the "motion image" or "low luminance", the controlling unit 23 controls the luminance correcting unit 24 to execute the third correction process (without the luminance correction).

According to the present embodiment described above, for the "high luminance and high contrast still image" frequently input through with the PC input signal, the "burn-in" can be effectively abated without impairing the image visibility and operability. For the "high luminance and low contrast still image" frequently input through the DSC input signal, the "burn-in" can be abated while maintaining the image gradation (tone). For a motion image and a low luminance image with which the "burn-in" does not easily occur, the correction process can be skipped.

Further, since the correction processes are differentiated corresponding to the image characteristics, not to the input modes, the present embodiment offers advantages in that the second or third correction process can be executed also for the PC input signal. For example, when an image captured by a digital camera is viewed on a PC, the second correction process can be executed; and when a motion image is played back on the PC, the third correction process can be executed. Similarly, even in the event that a still image or a high contrast image is input through the TV signal, the first or second correction process can be appropriately executed.

Consequently, irrelevant to the type of the input signal, the "burn-in" can be abated while maintaining high display quality.

This application claims priority from Japanese Patent Application No. 2004-38458 filed Feb. 16, 2004, which is hereby incorporated by reference herein.

What is claimed is:

1. An image processing apparatus for performing image processes corresponding to input signals of multiple types, comprising:
  a luminance correcting unit that performs a correction process on an input signal so as to correct for display luminance, wherein
  the luminance correcting unit selects and executes:
  a first correction process that decreases a luminance of a highlight portion of an image while maintaining or increasing the luminance of a halftoned portion of the image, when the input signal is an input signal from a computer;
  a second correction process that decreases the luminance for substantially overall tone levels of the image, when the input signal is an input signal from a digital camera; and
  a third correction process that does not change the luminance, when the input signal is a TV signal.

2. An image processing apparatus for performing image processes corresponding to input signals of multiple types, comprising:
  a luminance correcting unit that performs a correction process on an input signal so as to correct for display luminance;
  a luminance decreasing unit that multiplies the input signal with a gain smaller than "1"; and
  a gamma correcting unit that performs gamma correction with a gamma value smaller than "1" on the input signal, wherein
  the luminance decreasing unit and the gamma correcting unit are combined together, thereby to execute a first correction process that decreases a luminance of a highlight portion of an image while maintaining or increasing the luminance of a halftoned portion of the image, and wherein
  the luminance decreasing unit executes a second correction process that decreases the luminance for substantially overall tone levels of the image.

3. An image processing apparatus for performing image processes corresponding to input signals of multiple types, comprising:
  a luminance correcting unit that performs a correction process on an input signal so as to correct for display luminance;
  an image identifying unit that identifies whether an image being input through the input signal is a motion image or a still image; and
  an image-quality identifying unit that identifies whether the image is of a high luminance or a low luminance in comparison with a predetermined luminance reference and that identifies whether the image is of a high contrast or a low contrast in comparison with a predetermined contrast reference, wherein:
  when the image is identified to be the still image of the high luminance and the high contrast, the luminance correcting unit executes a first correction process that decreases a luminance of a highlight portion of an image while maintaining or increasing the luminance of a halftoned portion of the image;
  when the image is identified to be the still image of the high luminance and the low contrast, the luminance correcting unit executes a second correction process that decreases the luminance for substantially overall tone levels of the image; and
  when the image is identified to be the motion image or the still image of the low luminance, the luminance correcting unit executes a third correction process that does not change the luminance.

4. An image processing method for performing image processes corresponding to input signals of multiple types, the method comprising:
  a receiving step for receiving an input signal; and
  a luminance correcting step for performing a correction process on the input signal so as to correct for display luminance, wherein the luminance correcting step includes:
  a luminance decreasing process that multiplies the input signal with a gain smaller than "1", and a gamma correcting process that performs gamma correction with a gamma value smaller than "1" on the input signal,
  a correction process that decreases a luminance of a highlight portion of an image while maintaining or increasing the luminance of a halftoned portion of the image by combining the luminance decreasing process and the gamma correcting process, and
  a correction process that decreases the luminance for substantially overall tone levels of the image by the luminance decreasing process.

* * * * *

UNITED STATES PATENT AND TRADEMARK OFFICE
CERTIFICATE OF CORRECTION

| | |
|---|---|
| PATENT NO. | : 7,400,363 B2 |
| APPLICATION NO. | : 11/049676 |
| DATED | : July 15, 2008 |
| INVENTOR(S) | : Kazumi Suga et al. |

It is certified that error appears in the above-identified patent and that said Letters Patent is hereby corrected as shown below:

SHEET 11:

FIG. 9, "CAMMA" should read --GAMMA--.

COLUMN 3:

Line 24, "is" (second occurrence) should be deleted.

COLUMN 5:

Line 33, "the" (first occurrence) should be deleted.

COLUMN 8:

Line 65, "with" should be deleted.

Signed and Sealed this

Twelfth Day of May, 2009

JOHN DOLL
*Acting Director of the United States Patent and Trademark Office*